US009232190B1

(12) United States Patent
Vendrow

(10) Patent No.: US 9,232,190 B1
(45) Date of Patent: Jan. 5, 2016

(54) SYSTEMS AND METHODS FOR MANAGING MULTIMEDIA CONFERENCE CALLS

(71) Applicant: RingCentral, Inc., San Mateo, CA (US)

(72) Inventor: Vlad Vendrow, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 14/676,374

(22) Filed: Apr. 1, 2015

(51) Int. Cl.
H04N 7/14 (2006.01)
H04N 7/15 (2006.01)

(52) U.S. Cl.
CPC ........................................ *H04N 7/15* (2013.01)

(58) Field of Classification Search
CPC ................... H04M 2203/50–2203/509; H04M 3/56–3/569; H04L 12/18–12/1831
USPC .................... 348/14.01–14.16; 370/229–271, 370/351–357; 379/201.01, 202.01–207.01, 379/67.1–88.28; 709/201–207, 217–248
See application file for complete search history.

(56) References Cited

U.S. PATENT DOCUMENTS

| 5,835,130 | A  | * | 11/1998 | Read et al. .................. 348/14.11 |
| 6,661,448 | B2 |   | 12/2003 | Lunden |
| 8,044,989 | B2 | * | 10/2011 | Mareachen ................ 348/14.08 |
| 8,310,521 | B2 | * | 11/2012 | Zhang et al. ............... 348/14.15 |
| 8,704,868 | B2 |   | 4/2014  | Ozeki et al. |
| 2002/0194595 | A1 |   | 12/2002 | Miller et al. |
| 2006/0087687 | A1 | * | 4/2006  | Eom ............................ 358/1.15 |
| 2006/0271978 | A1 | * | 11/2006 | Watanabe ........................ 725/89 |
| 2009/0040290 | A1 | * | 2/2009  | Jeong et al. ................ 348/14.13 |
| 2009/0097563 | A1 | * | 4/2009  | Brown et al. ............. 375/240.16 |
| 2010/0271455 | A1 | * | 10/2010 | Sawada ...................... 348/14.02 |
| 2011/0072366 | A1 |   | 3/2011  | Spencer et al. |
| 2013/0242030 | A1 |   | 9/2013  | Kato et al. |
| 2014/0111597 | A1 |   | 4/2014  | Anderson et al. |

FOREIGN PATENT DOCUMENTS

| JP | 4-154290       | 5/1992  |
| JP | 6-296277       | 10/1994 |
| JP | 2009-77380     | 4/2009  |
| KR | 10-2011-0138094 | 12/2011 |

* cited by examiner

*Primary Examiner* — Hemant Patel
(74) *Attorney, Agent, or Firm* — Finnegan, Henderson, Farabow, Garrett & Dunner LLP

(57) ABSTRACT

Systems and methods are disclosed for managing a multimedia conference call. According to certain embodiments, a server establishes a multimedia conference call between a plurality of multimedia conference devices. The multimedia conference call includes the communication of multimedia conference contents via one or more of the plurality of multimedia conference devices. The server also records at least a portion of the multimedia conference contents; and detects one or more interrupting events. The interrupting events occur during the multimedia conference call. The server further provides substitute contents to the other multimedia conference devices of the plurality of multimedia conference devices. The substitute contents are generated based on a recorded portion of the multimedia conference call associated with a time to the interrupting events.

18 Claims, 5 Drawing Sheets

SYSTEMS AND METHODS FOR MANAGING MULTIMEDIA CONFERENCE CALLS

BACKGROUND

A video conferencing system allows two or more conference participants to conduct conferences by two-way or multi-way video and audio transmissions using conference devices capable of performing multimedia communications. A video conferencing system uses digital compression technologies to compress the video and audio streams in real time and transmit the compressed video and audio streams through a network, such as an integrated services digital network (ISDN) network or an Internet protocol (IP) network. A video conferencing system allows concurrent transmitting and receiving of video and audio streams by any conference device connected to the conference.

DETAILED DESCRIPTION

Figure 1:
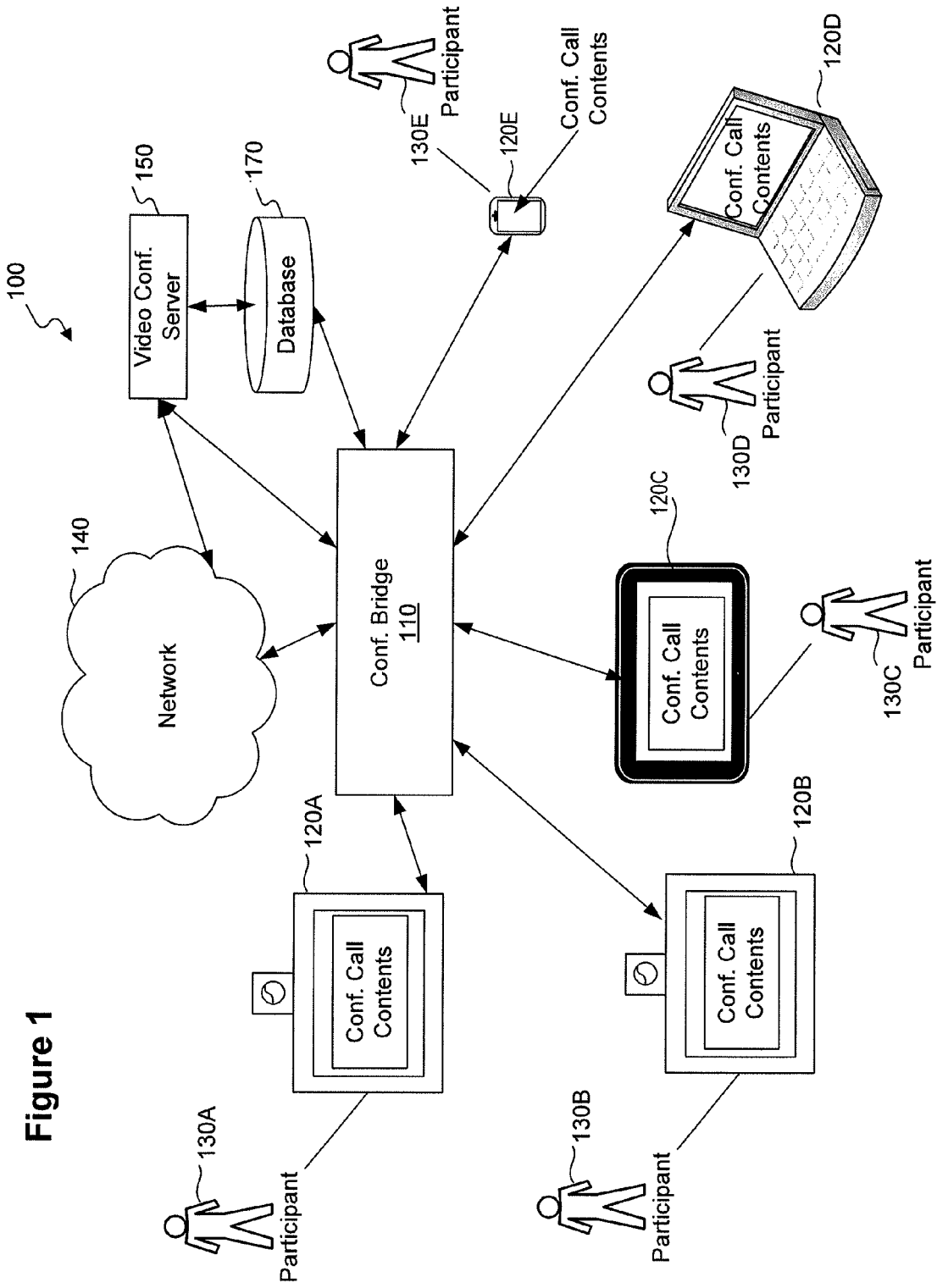
FIG. 1 is simplified diagrams of an example of a video conferencing system in which various implementations described herein may be practiced.

In a multimedia conference call, interruptions occurs due to a number of events including, for example, a lost connection, an intermittent connection, an action performed by the multimedia conference participant, server congestion, a conference device failure or one or more combinations. In current video conferencing systems, when an interrupting event occurs, the transmission of the multimedia conference contents may be paused or stopped. As a result, video streams, audio streams, or a combination of both associated with one or more of the multimedia conference participants are not transmitted until the interrupting event terminates. Interruptions can be unique to one multimedia conference participant, but can disrupt the video conferencing experience for other multimedia conference participants.

In the present disclosure, a video conferencing server is provided to establish a multimedia conference call between a plurality of multimedia conference devices. The multimedia conference call includes the communication of multimedia conference contents via one or more of the plurality of multimedia conference devices. The video conferencing server further records at least a portion of the multimedia conference contents and detects one or more interrupting events. The interrupting events occur during the multimedia conference call. The video conferencing server further provides substitute contents to the other multimedia conference devices of the plurality of multimedia conference devices. The substitute contents are generated based on a recorded portion of the multimedia conference call associated with a time to the interrupting event. By providing the substitute contents, the video conferencing server provides an improved (e.g., smoother or seamless) video conferencing experience despite the occurrence of interruptions during the multimedia conference call.

Reference will now be made in detail to methods and specific implementations that seek to overcome the foregoing shortcomings of current video conferencing systems. Examples of these implementations are described in connection with the following embodiments that are illustrated in the accompanying drawings. It should be noted that these example embodiments are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Methods, systems, and computer program products are provided herein for managing a multimedia conference call in video conferencing systems and thereby improve the operation of video conferencing systems as well as components of such systems. According to various implementations, a video conferencing system includes at least one processor of a server that establishes a multimedia conference call between a plurality of multimedia conference devices. The multimedia conference call includes the communication of multimedia conference contents via one or more of the plurality of multimedia conference devices. The server also records at least a portion of the multimedia conference contents; and detects an interrupting event associated with a first multimedia conference device of the plurality of multimedia conference devices. The interrupting event occurs during the multimedia conference call. The server can further provide substitute contents to the other multimedia conference devices of the plurality of multimedia conference devices. The substitute contents are generated based on a recorded portion of the multimedia conference call associated with a time to the interrupting event. In various embodiments described herein, managing of a multimedia conference call can be accomplished automatically to provide conference participants with an improved conference experience.

The example embodiments herein include computer-implemented methods, tangible non-transitory computer-readable mediums, and systems. The computer-implemented methods can be executed, for example, by at least one processor that receives instructions from a non-transitory computer-readable storage medium. Similarly, systems consistent with the present disclosure can include at least one processor and memory, and the memory can be a non-transitory computer-readable storage medium. As used herein, a non-transitory computer-readable storage medium refers to any type of memory on which information or data readable by at least one processor can be stored. Examples storage media include random access memory (RAM), read-only memory (ROM), volatile memory, nonvolatile memory, hard drives, CD ROMs, DVDs, flash drives, disks, flash memories, registers, caches, and any other storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 depicts an example of a video conferencing system 100 in which managing of a multimedia conference call as described herein can be implemented. Video conferencing system 100 enables a plurality of multimedia conference devices to communicate based on substantially real time multi-way video and audio transmissions. In some examples, one or more components of video conferencing system 100, such as conference bridge 110, server 450, or both, can be used to implement computer programs, applications, methods, processes, or other software to perform the described techniques and to realize the structures described herein.

As shown in FIG. 1, video conferencing system 100 includes a conference bridge 110, one or more multimedia conference devices 120A-E (collectively as multimedia conference devices 120), a network 140, a video conferencing server 150, and a database 170. The components and arrangements shown in FIG. 1 are not intended to limit the disclosed embodiments, as the system components used to implement the disclosed processes and features can vary. For example, while FIG. 1 illustrates that multimedia conference devices 120A-E communicate with conference bridge 110, in some embodiments, one or more of multimedia conference devices 120A-E communicates with video conferencing server 150 directly.

Conference bridge 110 can be a device or group of devices configured to connect multimedia conference devices 120A-E in a conference call. Conference bridge 110 includes one or more non-transitory computer readable mediums and one or more processors for performing functions related to the disclosed methods, such as receiving video and/or audio streams from one or more multimedia conference devices 120A-E, and providing the received streams to the other multimedia conference devices 120A-E.

As an example, conference bridge 110 can be a multipoint control unit (MCU) bridge that connects multimedia conference calls from a plurality of multimedia conference devices 120A-E. To establish a multimedia conference, conference bridge 110 calls multimedia conference devices 120A-E or multimedia conference participants 130A-E (collectively as multimedia conference participants 130) use multimedia conference devices 120A-E to call conference bridge 110. Conference bridge 110 can be an Internet Protocol (IP) or ISDN based video conferencing bridge.

In some embodiments, conference bridge 110 comprises hardware and/or software components. For example, conference bridge 110 includes a multipoint controller (MC) and one or more multipoint processors (MP). The MC controls the conferencing while it is active on the signaling plane, which is where video conferencing system 100 manages conferencing creation, endpoint signaling, and in-conferencing controls. The MC of conference bridge 110 can negotiate parameters with one or more multimedia conference devices 120A-E and control conferencing resources. While the MC controls resources and signaling negotiations, the MP operates on the media plane and receives media from one or more multimedia conference devices 120A-E. The MP generates output streams from one or more multimedia conference devices 120A-E and redirects the information to other multimedia conference devices 120A-E in the conference. In some embodiments, conference bridge 110 can communicate or integrate with video conferencing server 150, which executes some of the software components of conference bridge 110 by one or more processors of video conferencing server 150.

As shown in FIG. 1, video conferencing system 100 includes various types of multimedia conference devices 120A-E. As a first example, multimedia conference devices 120A, 120B, and 120D comprise a video screen such as a television, tablet, computer monitor, video conferencing console, or laptop computer screen. Multimedia conference devices 120A, 120B, and 120D can also include video/audio input devices such as a video camera, web camera, or a wearable device such as a smartwatch. As a second example, multimedia conference devices 120C and 120E comprise mobile devices such as a tablet or a smartphone having display and video/audio capture capabilities. In some embodiments, video conferencing system 100 also includes devices without display or video capture capabilities, such as a cellular phone or a telephone (not shown). Multimedia conference devices 120A-E can also perform digital compression and decompression of audio and video streams. For example, multimedia conference devices 120A-E have hardware and/or software components such as coders/decoders (codec) to perform the digital compression in substantially real time. In some embodiments, multimedia conference devices 120A-E are operated by one or more multimedia conference participants such as multimedia conference participants 130. An example embodiment of multimedia conference devices 120A-E is described in more detail below.

In some embodiments, video conferencing system 100 provides multimedia conference calls based on decentralized multipoint technologies (e.g., the H.323 technique). Using decentralized multipoint technologies, multimedia conference devices 120A-E exchange videos and audios directly with the other multimedia conference devices 120A-E without a conference bridge or a centralized conference manager or controller.

Network 140 comprises any type of computer networking arrangement used to exchange data. For example, network 140 can be the Internet, a private data network, virtual private network using a public network, a satellite link, and/or other suitable connection(s) that enables video conferencing system 100 to send and receive information between the components of video conferencing system 100. Network 140 also includes a public switched telephone network ("PSTN") and/or a wireless network such as a cellular network, Wi-Fi network, or other known wireless network capable of bidirectional data transmission.

Video conferencing server 150 can be a computer-based system including computer system components, desktop computers, workstations, tablets, hand held computing devices, memory devices, and/or internal network(s) connecting the components. Video conferencing server 150 can include one or more non-transitory computer readable mediums and one or more processors for performing functions related to the disclosed methods, such as receiving video and/or audio streams from one or more multimedia conference devices 120A-E, and providing the received streams to the other multimedia conference devices 120A-E. Video conferencing server 150 is a communication server that provides telecommunication services (e.g., voice, video, email, and/or facsimile) to multimedia conference devices 120A-E. Video conferencing server 150 can also be a video streaming server implementing, for example, the multipoint processors (MP) of conference bridge 110. As stated above, the MP operates on the media plane and receives media from one or more multimedia conference devices 120A-E. The MP generates output streams from one or more multimedia conference devices 120A-E and redirects the streams to other multimedia conference devices 120A-E in the conference. An example video conferencing server 150 is described in more detail below.

Database 170 includes one or more physical or virtual storages in communication with conference bridge 110 and/or video conferencing server 150. Database 170 stores, for example, recorded multimedia conference contents for the current conference call and/or for any previous conference calls. Database 170 can also store video/audio messages or recordings provided by the multimedia conference participants 130. As an example, using a multimedia conference device 120, a multimedia conference participant 130 records a video clip introducing himself or herself, a video clip providing conference call related information, photos of the multimedia conference participants, or one or more audio messages. As an example, a video clip can be generated by a multimedia conference device 120 used by multimedia conference participant 130 or by video conferencing server 150. The video clip can be generated based on a recorded previous multimedia conference call that multimedia conference participant 130 attended at the same location as that of the current multimedia conference, where the current conference call has generally the same other multimedia conference participants as those of the previous conference call. The recorded video clips, photos, or audio messages can be transmitted to video conferencing server 150 and stored in database 170 before or during the current conference call. The stored video clips, photos, or audio messages can be used as substitute contents when an interrupting event occurs during an ongoing conference call.

Referring to FIG. 1, conference bridge 110 and/or video conferencing server 150 establishes a multimedia conference call (e.g., a video call and/or an audio call) among multimedia conference devices 120A-E. For example, conference bridge 110 and/or video conferencing server 150 call each multimedia conference devices 120A-E, or each multimedia conference devices 120A-E call conference bridge 110 and/or video conferencing server 150, which then operatively connect all participating multimedia conference devices 120A-E. After the multimedia conference call is established, multimedia conference contents are transmitted and received by one or more of multimedia conference devices 120A-E. Multimedia conference contents include, for example, video and/or audio streams, documents such as Microsoft Powerpoint slides, webcasts, podcasts, photos, texts, or messages. For example, in an established multimedia conference call using video conferencing system 100, multimedia conference participant 130A presents to the other multimedia conference participants 130B-E. Multimedia conference device 120A transmits multimedia conference contents, such as video streams showing multimedia conference participant 130A and/or any information he or she shares, to conference bridge 110 and/or video conferencing server 150. Conference bridge 110 and/or video conferencing server 150 processes the multimedia conference contents received from multimedia conference device 120A and redirect the processed multimedia conference contents to other participating multimedia conference devices 120B-E for viewing by other multimedia conference participants 130B-E. As a result, the screens of multimedia conference devices 120B-E display the multimedia conference contents shared by multimedia conference participant 130A.

Figure 2:
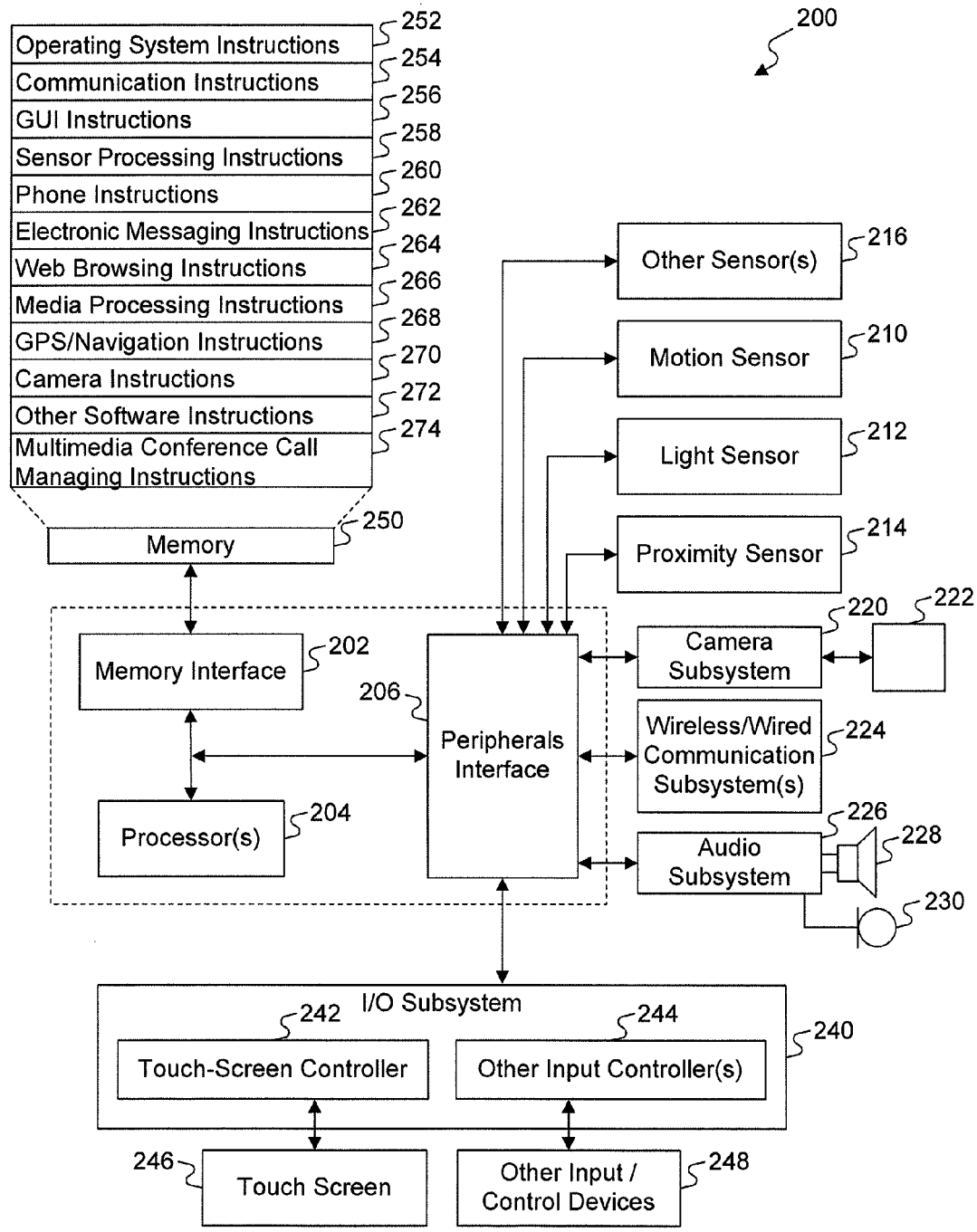
FIG. 2 is a diagram of an example multimedia conference device used in a video conferencing system for implementing embodiments consistent with the present disclosure.

FIG. 2 is a diagram of an example multimedia conference device 200 used in a video conferencing system. Multimedia conference device 200 can function as any of the multimedia conference devices 120A-E devices depicted in FIG. 1. Multimedia conference device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the multimedia conference device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, communication device 200. For example, a GPS receiver can be built into mobile telephones, such as smartphone devices. GPS software allows mobile telephones to use an internal or external GPS receiver (e.g., connecting via a serial port or Bluetooth).

A camera subsystem 220 and an optical sensor 222, e.g., a charged coupled device ("CCD") or a complementary metal-oxide semiconductor ("CMOS") optical sensor, can be utilized to facilitate camera functions, such as recording photographs and video clips.

Communication functions can be facilitated through one or more wireless/wired communication subsystems 224, which includes a Ethernet port, radio frequency receivers and transmitters and/or optical (e.g., infrared) receivers and transmitters. The specific design and implementation of the wireless/wired communication subsystem 224 depends on the communication network(s) over which the multimedia conference device 200 is intended to operate. For example, in some embodiments, the multimedia conference device 200 includes wireless/wired communication subsystems 224 designed to operate over a GSM network, a GPRS network, an EDGE network, a Wi-Fi or WiMax network, and a Bluetooth® network. In particular, the wireless/wired communication subsystems 224 includes hosting protocols such that the multimedia conference device 200 can be configured as a base station for other wireless devices.

An audio subsystem 226 can be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246.

The other input controller(s) 222 is coupled to other input/control devices 248, such as one or more buttons, rocker switches, thumb-wheel, infrared port, USB port, and/or a pointer device such as a stylus. The one or more buttons (not shown) include an up/down button for volume control of the speaker 228 and/or the microphone 230. The touch screen 246 can, for example, also be used to implement virtual or soft buttons and/or a keyboard.

In some implementations, the multimedia conference device 200 presents recorded audio and/or video files, such as MP3, MP4, RM, RMVB, WMV, AVI, FLV, VOB, AAC, and MPEG files. In some implementations, the multimedia conference device 200 can include the functionality of an MP3 player.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 also stores communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 also includes multimedia conference call managing instructions 274 to facilitate conference call related processes and instructions. In some implementations, the media processing instructions 266 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 250 can include additional instructions or fewer instructions. Furthermore, various functions of the multimedia conference device 200 can be implemented in hardware and/or in software, including in one or more signal processing and/or application specific integrated circuits.

Figure 3:
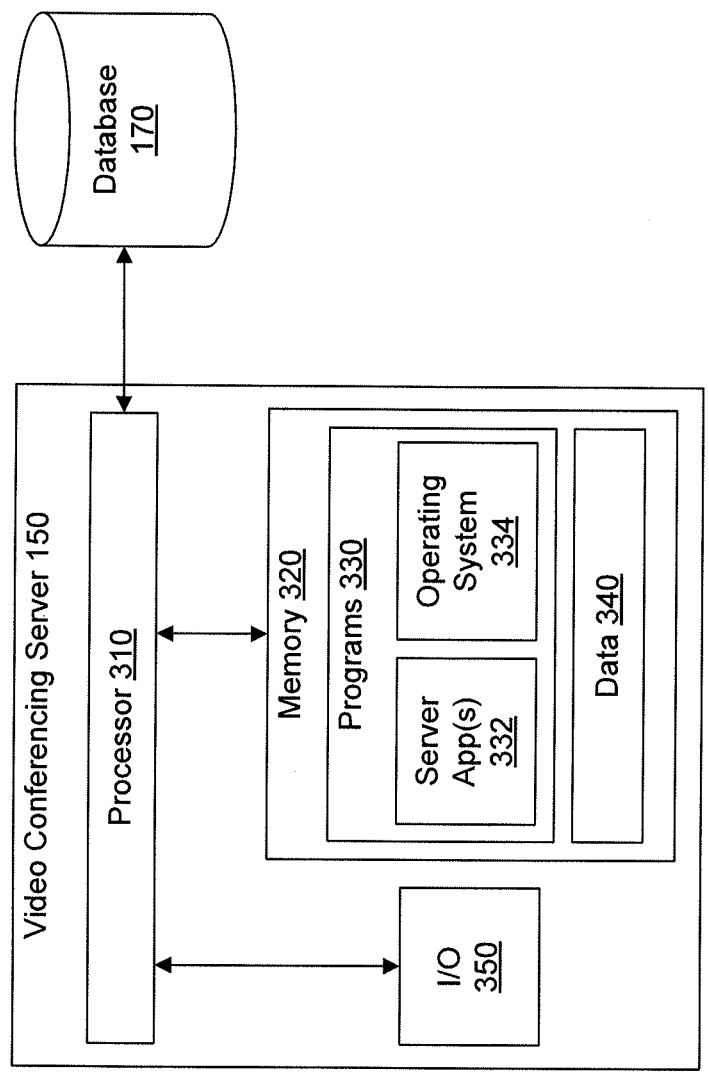
FIG. 3 is a diagram of an example video conferencing server, consistent with the disclosed embodiments.

FIG. 3 shows a diagram of an example video conferencing server 150, consistent with the disclosed embodiments. As shown, video conferencing server 150 can include one or more processors 310, input/output ("I/O") devices 350, and one or more memories 320 storing programs 330 including, for example, server app(s) 332, operating system 334, and data 340, and can communicate with an external database 170 (which, for some embodiments, can be included within video conferencing server 150). Video conferencing server 150 can be a single server or can be configured as a distributed computer system including multiple servers, server farms, clouds, or computers that interoperate to perform one or more of the processes and functionalities associated with the disclosed embodiments.

Processor 310 can be one or more processing devices configured to perform functions of the disclosed methods, such as a microprocessor manufactured by Intel™ or manufactured by AMD™. Processor 310 can constitute a single core or multiple core processors executing parallel processes simultaneously. For example, processor 310 can be a single core processor configured with virtual processing technologies. In certain embodiments, processor 310 uses logical processors to simultaneously execute and control multiple processes. Processor 310 can implement virtual machine technologies, or other technologies to provide the ability to execute, control, run, manipulate, store, etc. multiple software processes, applications, programs, etc. In some embodiments, processor 310 includes a multiple-core processor arrangement (e.g., dual, quad core, etc.) configured to provide parallel processing functionalities to allow video conferencing server 150 to execute multiple processes simultaneously. It is appreciated that other types of processor arrangements could be implemented that provide for the capabilities disclosed herein.

Memory 320 can be a volatile or non-volatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Video conferencing server 150 includes one or more storage devices configured to store information used by processor 310 (or other components) to perform certain functions related to the disclosed embodiments. For example, video conferencing server 150 includes memory 320 that includes instructions to enable processor 310 to execute one or more applications, such as server apps 332, operating system 334, and any other type of application or software known to be available on computer systems. Alternatively or additionally, the instructions, application programs, etc. can be stored in an external database 170 (which can also be internal to video conferencing server 150) or external storage in communicatively coupled with video conferencing server 150 (not shown), such as one or more database or memory accessible over network 140.

Database 170 or other external storage can be a volatile or non-volatile, magnetic, semiconductor, tape, optical, removable, non-removable, or other type of storage device or tangible or non-transitory computer-readable medium. Memory 320 and database 170 can include one or more memory devices that store data and instructions used to perform one or more features of the disclosed embodiments. Memory 320 and database 170 can also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, video conferencing server 150 is communicatively coupled to one or more remote memory devices (e.g., remote databases (not shown)) through network 140 or a different network. The remote memory devices can be configured to store information that video conferencing server 150 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Programs 330 can include one or more software modules causing processor 310 to perform one or more functions of the disclosed embodiments. Moreover, processor 310 can execute one or more programs located remotely from one or more components of video conferencing system 100. For example, video conferencing server 150 can access one or more remote programs that, when executed, perform functions related to disclosed embodiments. In some embodiments, programs 330 stored in memory 320 and executed by processor(s) 310 can include one or more server app(s) 332 and operating system 334.

Server app(s) 332 cause processor 310 to perform one or more functions of the disclosed methods. For example, server app(s) 332 cause processor 310 to establish a multimedia conference call between a plurality of multimedia conference devices 120; record at least a portion of the multimedia conference contents; detect an interrupting event associated with a first multimedia conference device (e.g., 120A) of the plurality of multimedia conference devices; and provide substitute contents to the other multimedia conference devices (e.g., 120B and 120C) of the plurality of multimedia conference devices. In some embodiments other components of video conferencing system 100 are configured to perform one or more functions of the disclosed methods. For example, multimedia conference device 120A-E are configured to establish a multimedia conference call between a plurality of multimedia conference devices 120A-E; record at least a portion of the multimedia conference contents; detect an interrupting event associated with a first multimedia conference device (e.g., 120A) of the plurality of multimedia conference devices; and provide substitute contents to the other multimedia conference devices (e.g., 120B and 120C) of the plurality of multimedia conference devices.

In some embodiments, program(s) 330 include operating system 334 performing operating system functions when executed by one or more processors such as processor 310. By way of example, operating system 334 include Microsoft Windows™, Unix™, Linux™, Apple™ operating systems, Personal Digital Assistant (PDA) type operating systems, such as Microsoft CE™, or other types of operating systems 334. Accordingly, disclosed embodiments can operate and function with computer systems running any type of operating system 334. Video conferencing server 150 can also include communication software that, when executed by a processor, provides communications with network 140 and/or a direct connection to one or more multimedia conference devices 120A-E.

In some embodiments, data 340 include, for example, multimedia conference contents and/or substitute contents. For example, data 340 include buffered or processed video/audio streams provided by multimedia conference devices 120A-E, information associated with the present or previous conference call, a video clip introducing a multimedia conference participant 130, a video clip providing conference call related information, photos of the multimedia conference participants, or one or more audio messages.

Video conferencing server 150 also includes one or more I/O devices 350 having one or more interfaces for receiving signals or input from devices and providing signals or output to one or more devices that allow data to be received and/or transmitted by video conferencing server 150. For example, video conferencing server 150 include interface components for interfacing with one or more input devices, such as one or more keyboards, mouse devices, and the like, that enable video conferencing server 150 to receive input from an operator or administrator (not shown).

Figure 4:
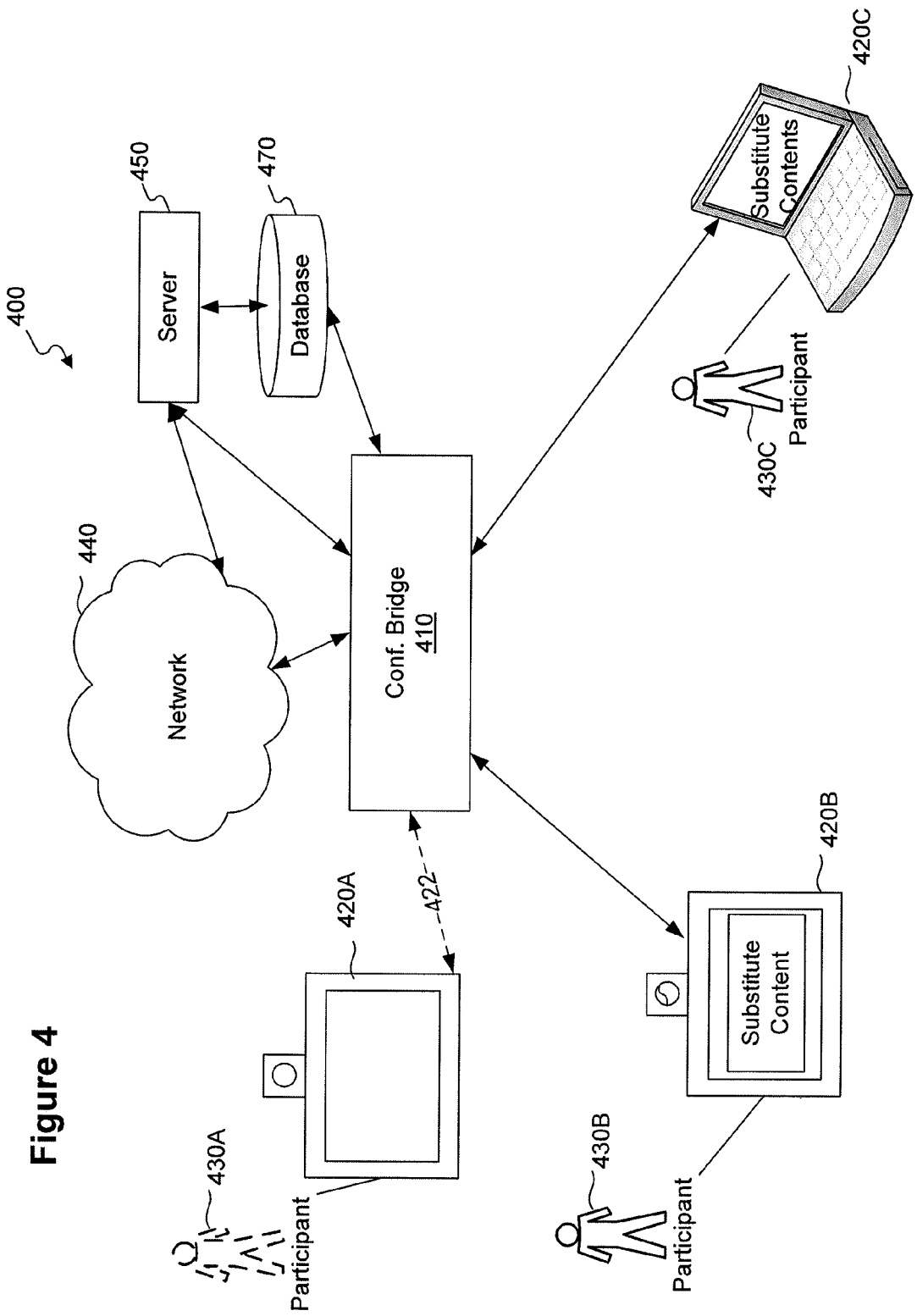
FIG. 4 is a simplified diagram of an example video conferencing system in which various implementations described herein may be practiced.

FIG. 4 is simplified diagram of an example video conferencing system 400 in which various implementations of managing a multimedia conference call during one or more interrupting events may be practiced. As shown in FIG. 4, similar to video conferencing system 100, video conferencing system 400 includes a conference bridge 410, one or more multimedia conference devices 420A-C (collectively as multimedia conference devices 420), a network 440, a server 450, and a database 470. The components and arrangements shown in FIG. 4 are not intended to limit the disclosed embodiments, as the system components used to implement the disclosed processes and features can vary.

Conference bridge 410, multimedia conference devices 420, network 440, server 450, and database 470 can operate or function similarly as conference bridge 110, multimedia conference devices 120A-E, network 140, video conferencing server 150, and database 170, respectively, and thus are not repeatedly described. Moreover, conference bridge 410 and/or server 450 can be implemented using video conferencing server 150 as depicted in FIG. 3 and described above. Multimedia conference devices 420 can be implemented the same or similar as multimedia conference device 200 as depicted in FIG. 2 and described above.

Referring to FIG. 4, conference bridge 410 establishes a multimedia conference call between a plurality of multimedia conference devices 420. While it is appreciated that the embodiments described herein can work on the conference bridge 410, server 450, or a combination of both, for purposes of simplicity the example embodiment of FIG. 4 is explained with respect to conference bridge 410. Video conference contents can be transmitted from one or more multimedia conference devices 420 to conference bridge 410. Conference bridge 410 can redirect the multimedia conference contents to other multimedia conference devices 420. Conference bridge 410 also processes the multimedia conference contents first and transmit the processed multimedia conference contents to other multimedia conference devices 420. For example, conference bridge 410 can buffer, compress, and/or optimize the multimedia conference contents before transmitting the processed contents.

In some embodiments, conference bridge 410 records the multimedia conference contents of the current multimedia conference call and/or any previous multimedia conference calls. For example, during a conference call, multimedia conference device 420A generates video and/or audio streams containing images and/or voices of multimedia conference participant A. The video and/or audio streams are transmitted to conference bridge 410. Besides providing the video and/or audio streams to other multimedia conference devices 420B and 420C, conference bridge 410 records the video and/or audio streams and store them in database 470. In some embodiments, conference bridge 410 processes, such as buffer, compress and/or optimize, the video and/or audio streams, before storing them in database 470.

In some embodiments, conference bridge 410 records the entire multimedia conference contents received from the beginning of the conference call. Conference bridge 410 can also record any portion of the conference call, e.g., a portion of the multimedia conference contents that is adjacent in time to the present time. For example, conference bridge 410 records the last few seconds or last few minutes of the conference call.

Conference bridge 410 also monitors the status of the multimedia conference call and the status of multimedia conference participants. Conference bridge 410 detects one or more interrupting events based on such monitoring. The status of the multimedia conference call can include, for example, not yet started, ongoing, uninterrupted, interrupted, resumed, or expired conference calls. In a multimedia conference call, one or more (e.g., two) categories of interrupting events can occur. In a first category, an interrupting event can include at least one of: a degraded connectivity or performance of a multimedia conference device, a degraded connectivity or performance of a conference bridge, or any other degradation that impact the quality of services. In a second category, an interrupting event can include at least one of: an unavailability of the multimedia conference participant using the multimedia conference device, or an action performed by the multimedia conference participant using the multimedia conference device. Conference bridge 410 monitors the status of the multimedia conference call and the status of multimedia conference participants based on at least one interrupting event selected from the first category interrupting events and/or the second category interrupting events.

The degraded connectivity or performance of a multimedia conference device can be caused by, for example, a lost connection or an intermittent connection associated with the multimedia conference device, or a multimedia conference device failure. Referring to FIG. 4, for example, during a conference call, a network connection 422A between multimedia conference device 420A and conference bridge 410 can be lost or can become intermittent. The lost connection or intermittent connection can be attributed to a number of reasons such as network congestion, a failed Wi-Fi connection, a cellular signal weak spot, etc. As another example, the degraded connectivity or performance of multimedia conference device 420A can also be caused by lost power, depleted battery, hardware/software failure of multimedia conference device 420A. In some embodiments, conference bridge 410 can monitor and detect degraded connectivity or performance of a multimedia conference device 420. For example, conference bridge 410 can detect that transmission of the video and/or audio streams from multimedia conference device 420A is degrading or has momentarily failed. Conference bridge 410 can also detect network congestion or a lost connection to any multimedia conference devices 420.

The degraded connectivity or performance of a conference bridge can be caused by, for example, network congestion, a conferencing bridge or server overload, a lost power, or a hardware and/or software failure. For example, conference bridge 410 can become overloaded over time and thus the streaming of videos and audios to multimedia conference devices 420 is interrupted. In some embodiments, conference bridge 410 can detect its degraded connectivity or performance and initiate proper actions, such as requesting a peer conference bridge (not shown) to take over some of the processes or loads.

The unavailability of a participant may be caused by, for example, the participant being distracted by other activities such as a phone call from another line, an emergency, or an interruption of the participant by a third party. For example, during a conference call, while participant 430A is making a presentation, he can be interrupted by a co-worker at his office or a phone call from his cell phone. In some embodiments, conference bridge 410 can detect the unavailability of a participant (e.g., participant 430A) by determining, for example, whether the participant's multimedia conference device is still transmitting video data depicting the participant or audio data that contains the participant's voice signatures.

The action performed by a multimedia conference participant can also be an interrupting event. For example, during a conference call, participant 430A may need to step out of his office, speak to a co-worker at his office, or respond to an urgent call. Participant 430A can intentionally take an action to suspend or stop the transmission of video and/or audio contents. Such action may include selecting an option from a menu displayed on the screen of a multimedia conference device 120A-E to suspend, stop, or exit the conference call. In some embodiments, conference bridge 410 can detect any action performed by a multimedia conference participant by receiving one or more corresponding signals or messages from the participant's multimedia conference device.

Referring to FIG. 4, after conference bridge 410 detects an interrupting event, it provides substitute contents to one or more multimedia conference devices 420. As an example, after conference bridge 410 detects an interrupting event associated with multimedia conference device 420A (e.g., a lost connection or participant 430A is unavailable), it transmits substitute contents to multimedia conference devices 420B and 420C. In some embodiments, substitute contents can include recorded multimedia conference contents of the present conference call, e.g., a portion of recorded multimedia conference contents stored in database 470. The portion of the stored recorded multimedia conference contents can be adjacent in time to the time when the interrupting event occurs. For example, the substitute contents can be the last few seconds or the last few minutes of the recorded multimedia conference contents before the interrupting event occurs.

In some embodiments, conference bridge 410 estimates the duration of the interrupting event and determine the length of the substitute contents based on the type of the interrupting event and/or historical data. As an example, if the type of the interrupting event associated with multimedia conference device 420A is network congestion and history data indicates that average network congestion will last for only a few seconds, conference bridge 410 can estimate, based on historical data, that the duration of interrupting event due to network congestion is, for example, a few seconds. Conference bridge 410 can thus retrieve the last few seconds of the recorded multimedia conference contents from database 470 and provide to multimedia conference devices 420B and 420C.

As another example, if the type of the interrupting event associated with multimedia conference device 420A is an equipment failure (e.g., a battery depletion or a crash of operating system) or an unavailability of participant 430A, conference bridge 410 estimates, based on historical data, that the duration of interrupting events due to equipment failure or participants' unavailability is, for example, a few minutes. Conference bridge 410 can thus retrieve the last few minutes of the recorded multimedia conference contents from database 470 and provide to multimedia conference devices 420B and 420C. It is appreciated that conference bridge 410 can also estimate the duration of the interrupting event using historical data associated with any type of interrupting events, and determine the length of the substitute contents. In some embodiments, conference bridge 410 estimates the duration of the interrupting event based on network quality of service (QoS) or dynamic monitoring of the network conditions.

In some embodiments, the substitute contents can be any portion of the recorded multimedia conference contents. As an example, after conference bridge 410 detects an interrupting event associated with multimedia conference device 420A, it can send a notification to other multimedia conference devices 420B and 420C. Based on the notification, multimedia conference devices 420B and 420C displays a multimedia conference contents player, which can be a standalone player or a player embedded with a multimedia conference call application. Using the multimedia conference contents player, multimedia conference devices 420B and 420C can receive instructions from multimedia conference participants 430B and 430C to retrieve and play any desired portion of the recorded multimedia conference contents. Based on the received instruction, multimedia conference devices 420B and 420C retrieve from conference bridge 410 the desired portion of the recorded multimedia conference contents and play the retrieved contents.

In some embodiments, the substitute contents can be a recorded video clip of a multimedia conference participant. As an example, for registering with or logging into video conferencing system 400, conference bridge 410 can request each multimedia conference participant to record a short video to be used as substitute contents. In some embodiments, the substitute contents can also be one or more photos of the multimedia conference participant.

Video conferencing system 400 can aggregate substitute contents. For example, if conference bridge 410 detects that interrupting events are caused by a plurality of multimedia conference participants, it aggregates the substitute contents (e.g., concatenates recorded video clips recorded by multimedia conference participants that caused the interrupting events) and provides the aggregated substitute contents to one or more multimedia conference devices 420.

It is appreciated that substitute contents can be generated by conference bridge 410, server 450, and/or any multimedia conference devices 420. Substitute contents can also be provided or presented on any multimedia conference devices 420. The substitute contents can be stored in database 470, conference bridge 410, server 450, and/or multimedia conference devices 420. For example, in a decentralized video conferencing system, substitute contents can be stored on multimedia conference devices 420 and can be provided to other multimedia conference devices 420 when an interrupting event occurs.

As described above, conference bridge 410 provides substitute contents to one or more multimedia conference devices 420 for an estimated duration of the interrupting event. In some embodiments, conference bridge 410 instructs multimedia conference devices 420 to indicate to the multimedia conference participants that substitute contents are being provided. In some embodiments, after receiving the substitute contents, multimedia conference devices 420 indicates to the multimedia conference participants that substitute contents are being provided without receiving instructions from conference bridge 410. As an example, multimedia conference devices 420 displays a text of "substitute content" or a similar text. As another example, multimedia conference devices 420 can change the brightness, color, font, contrast, etc. of the display to indicate that substitute contents are being provided.

In some embodiments, conference bridge 410 also monitors the interrupting event and determine whether the interrupting events terminates. As an example, a conference bridge 410 monitors the connectivity of multimedia conference device 420A and determine that the connectivity is no longer degraded. Conference bridge 410 also monitors the connectivity or performance degradation of itself and determine whether such degradation (e.g., server overloading) terminates. Conference bridge 410 also monitors the status of participant 430A using, for example, video streams and/or audio streams transmitted from multimedia conference device 420A. Based on the monitoring, conference bridge 410 determines whether participant 430A become available again. Conference bridge 410 also monitors the action performed by participant 430A using the multimedia conference device 420A and determine whether participant 430A wish to resume participating the conference. For example, after participant 430A indicates (e.g., click a resume button) his or her desire to resume participating of the conference call, multimedia conference device 420A sends a notification to conference bridge 410 indicating the termination of the interrupting event.

After determining the termination of the interrupting event, conference bridge 410 discontinues to provide the substitute contents and enable the transmission of multimedia conference contents associated with the present conference call. For example, after determining that the termination of an interrupting event associated with multimedia conference device 420, conference bridge 410 can discontinue the transmission of the recorded multimedia conference contents and enable or resume the transmission of live video and audio streams provided by multimedia conference device 420A to multimedia conference devices 420B and 420C. In some embodiments, the resuming of the transmission of live video and audio streams includes a gradient. For example, if the substitute content is the last few seconds or the last few minutes of the recorded multimedia conference contents before the interrupting event occurs, conference bridge 410 gradually discontinues the transmission of the recorded multimedia conference contents and provides the live video and audio streams. Multimedia conference devices 420 gradually switch from the substitute contents to live video and audio streams. As a result, the resuming of the transmission of live video and audio streams appears more smoothly to the multimedia conference participants.

While the above descriptions use conference bridge 410 and server 450 as examples for performing some of the functions or methods, it is appreciated that such functions or methods can also be performed by any suitable components or subsystems of video conferencing system 400. For example, in some embodiments, multimedia conference device 420 establishes a multimedia conference call with other multimedia conference devices to transmit multimedia conference contents; records at least a portion of the multimedia conference contents; detects an interrupting event; and/or provides substitute contents to the other multimedia conference devices.

Figure 5:
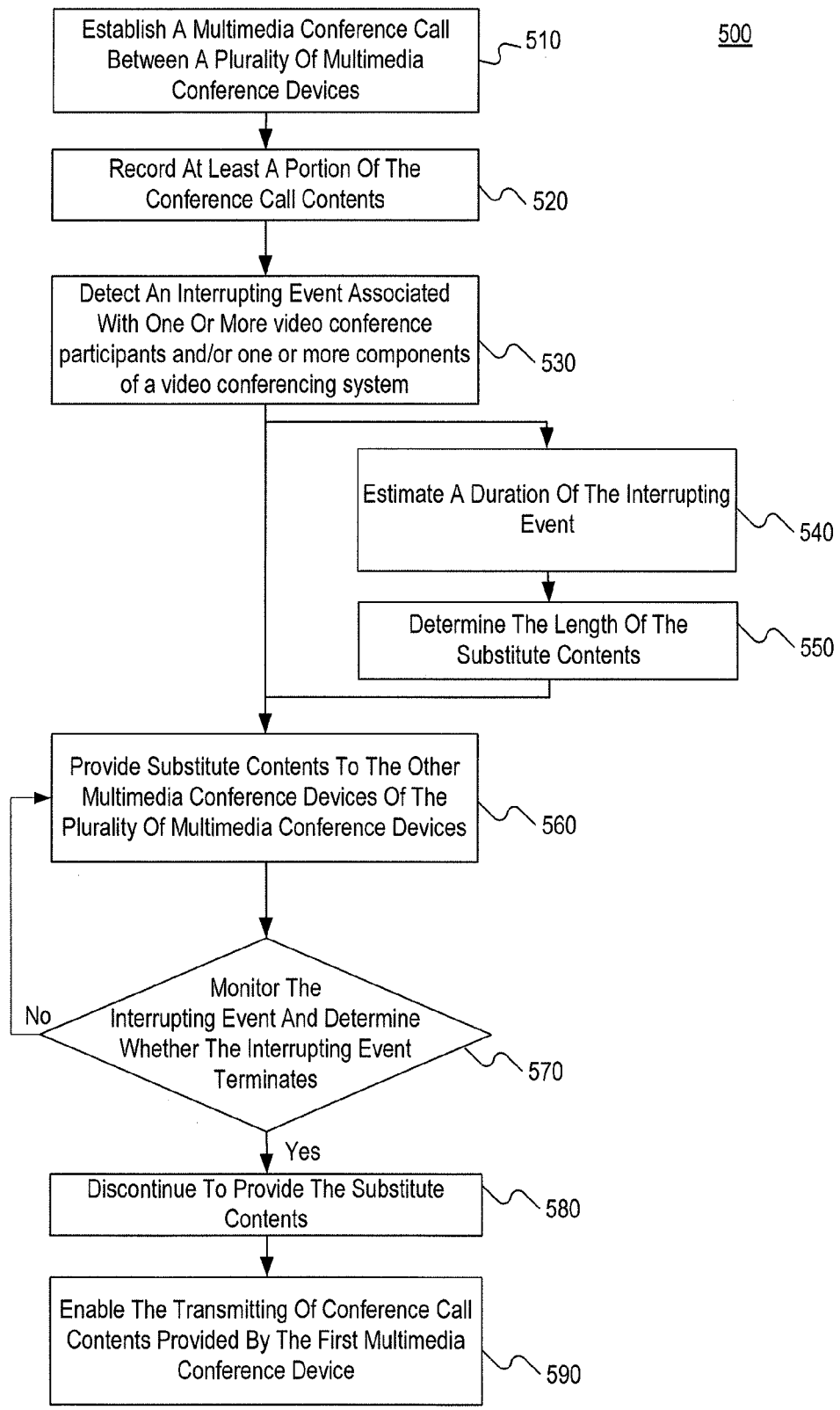
FIG. 5 is a flowchart illustrating operation of a particular implementation of a video conferencing system for managing multimedia conference calls.

FIG. 5 depicts an example process 500 for managing a multimedia conference call, in accordance with some embodiments of the present disclosure. The steps associated with this example process can be performed by one or more components of FIGS. 1-4. In the following description, reference is made to certain components of FIG. 4 for purposes of illustration. It will be appreciated, however, that other implementations are possible and that components other than that illustrated in FIG. 4 can be utilized to implement the example process of FIG. 5.

In step 510, a conference bridge and/or server (e.g., conference bridge 410 and/or server 450) establishes a multimedia conference call between a plurality of multimedia conference devices. While it is appreciated that the embodiments described herein can work on the conference bridge, server, or a combination of both, for purposes of simplicity the example embodiment of FIG. 5 is explained with respect to the conference bridge. The multimedia conference call includes transmitting and receiving multimedia conference contents by one or more of the plurality of multimedia conference devices. In some embodiments, the conference bridge can redirect the multimedia conference contents it received to the one or more multimedia conference devices. The conference bridge can also process the multimedia conference contents first and transmit the processed multimedia conference contents to the one or more multimedia conference devices.

In step 520, the conference bridge records at least a portion of the multimedia conference contents. For example, the conference bridge can record the entire multimedia conference contents received from the beginning of the conference call. The conference bridge can also record any portion of the conference call, e.g., a portion of the multimedia conference contents that is adjacent in time to the present time. For example, the conference bridge can record the last few seconds or last few minutes of the conference call. In some embodiments, the conference bridge records a mixed multimedia stream representing multimedia conference contents provided by all multimedia conference participants. In some embodiments, the conference bridge records separate multimedia streams representing multimedia conference contents provided by each individual multimedia conference participant.

In step 530, the conference bridge detects one or more interrupting events associated with one or more multimedia conference participants and/or one or more components of a video conferencing system (e.g., video conferencing system 400). The one or more interrupting events occur during the multimedia conference call. As described above, two categories of interrupting events can occur. In a first category, the one or more interrupting events include at least one of: a degraded connectivity or performance of a multimedia conference device, a degraded connectivity or performance of a conference bridge, or any other degradation that impact the quality of services. In a second category, the interrupting events include at least one of: an unavailability of the multimedia conference participant using the multimedia conference device, or an action performed by the multimedia conference participant using the multimedia conference device.

In some embodiments, the conference bridge estimates (step 540) a duration of the interrupting event. Step 540 is optional. As an example, the conference bridge can perform the estimation if the multimedia conference participant who caused the interrupting event does not provide the duration of interrupting event (e.g., the duration of his absence from the multimedia conference call). As another example, the conference bridge can also perform the estimation if the multimedia conference participant who caused the interrupting event provides the duration of the interrupting event but fails to terminate the interrupting event (e.g., fails to re-attend the multimedia conference call at the end of the duration the multimedia conference participant provided).

The conference bridge then determines (step 550) the length of the substitute contents based on the estimated duration. After such determination, the conference bridge can proceed to step 560. In some embodiments, the conference bridge can proceed directly to step 560 without performing steps 540 and 550. In some embodiments, the conference bridge changes the length of the substitute contents that is previously determined. For example, if the conference bridge detects that the interrupting event terminates before the estimated duration (e.g., a degradation of connectivity terminates or improves), the conference bridge changes the length of the substitute contents to reflect the change of the duration of the interrupting event.

In step 560, the conference bridge provides substitute contents to the other multimedia conference devices of the plurality of multimedia conference devices. The substitute contents can be generated based on a recorded portion of the multimedia conference call adjacent in time to the interrupting event. The conference bridge monitors the interrupting event and determines (step 570) whether the interrupting event terminates. After determining the interrupting event terminates, the conference bridge discontinues (step 580) to provide the substitute contents, and enable (step 590) the transmitting of multimedia conference contents provided by the first multimedia conference device. If the conference bridge determines that the interrupting event does not terminated, it can continue to provide (step 560) substitute contents to the other multimedia conference devices and continue to monitor the interrupting event and determine (step 570) whether the interrupting event terminates.

As will be appreciated from the foregoing, the process for managing multimedia conference calls can be accomplished automatically to provide substitute contents when an interrupting event occurs. This can improve the multimedia conference participants' experience with the conference call.

It should be noted that, despite references to particular computing paradigms and software tools herein, the computer program instructions with which embodiments of the invention may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular protocols herein are merely by way of examples. Suitable alternatives or those later developed known to those of skill in the art may be employed without departing from the scope of the subject matter in the present disclosure.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for managing a multimedia conference call, comprising:
    establishing a multimedia conference call between a plurality of multimedia conference devices, the multimedia conference call including communication of multimedia conference contents via one or more of the plurality of multimedia conference devices;
    detecting one or more interrupting events, wherein the one or more interrupting events occur during the multimedia conference call;
    providing substitute contents to the other multimedia conference devices of the plurality of multimedia conference devices, wherein the substitute contents are generated based on a recorded portion of the multimedia conference call associated with a time to the one or more interrupting events;
    estimating a duration of the one or more interrupting events based on one or more types of the one or more interrupting events and historical data; and
    determining a length of the substitute contents based on the estimated duration.

2. The method of claim 1, wherein the multimedia conference contents include at least one of: video streams, audio streams, documents, webcasts, podcasts, photos, texts, or messages.

3. The method of claim 1, further comprising, before providing the substitute contents:
recording at least a portion of the multimedia conference contents included in the multimedia conference call.

4. The method of claim 3, wherein recording at least a portion of the multimedia conference contents comprises recording a portion of the multimedia conference contents that is adjacent in time to a present time of the multimedia conference call.

5. The method of claim 1, further comprising, prior to detecting the one or more interrupting events, monitoring a status of the multimedia conference call, the status being one of: uninterrupted or interrupted.

6. The method of claim 1, wherein the one or more interrupting events include at least one interrupting event selected from: a first category of interrupting events and a second category of interrupting events;
wherein the first category of interrupting events includes a degraded connectivity or performance of a first multimedia conference device, and a degraded connectivity or performance of a conference bridge or a server; and
wherein the second category of interrupting events includes an unavailability of a first multimedia conference participant associated with the first multimedia conference device, and an action performed by the first multimedia conference participant associated with the first multimedia conference device.

7. The method of claim 1, further comprising:
facilitating to provide one or more indications to one or more multimedia conference participants, wherein the one or more indications provide information of at least one of the substitute contents and the estimated duration.

8. The method of claim 1, further comprising:
monitoring the one or more interrupting events; and
determining whether the one or more interrupting events terminate.

9. The method of claim 8, wherein monitoring the interrupting event comprises monitoring at least one of: a connectivity of the first multimedia conference device, a connectivity or performance of a conference bridge or a server, a status of a first multimedia conference participant associated with the first multimedia conference device, or an action performed by the first multimedia conference participant associated with the first multimedia conference device.

10. The method of claim 9, further comprising:
in response to determining the one or more interrupting events terminate, discontinuing to provide the substitute contents; and
enabling transmitting of multimedia conference contents provided by the first multimedia conference device.

11. A video conferencing server, comprising:
at least one memory configured to store a set of instructions; and
at least one processor configured to perform the set of instructions to cause the server to:
establish a multimedia conference call between a plurality of multimedia conference devices, the multimedia conference call including communication of multimedia conference contents via one or more of the plurality of multimedia conference devices;
record at least a portion of the multimedia conference contents;
detect one or more interrupting events, wherein the one or more interrupting events occur during the multimedia conference call;
provide substitute contents to the other multimedia conference devices of the plurality of multimedia conference devices, wherein the substitute contents are generated based on a recorded portion of the multimedia conference contents associated with a time to the one or more interrupting events;
estimate a duration of the one or more interrupting events based on one or more types of the one or more interrupting events and historical data; and
determine a length of the substitute contents based on the estimated duration.

12. The server of claim 11, wherein the multimedia conference contents include at least one of: video streams, audio streams, documents, webcasts, podcasts, photos, texts, or messages.

13. The server of claim 11, wherein the at least one processor is configured to record at least a portion of the multimedia conference contents by recording a portion of the multimedia conference contents that is adjacent in time to a present time of the multimedia conference call.

14. The server of claim 11, wherein the one or more interrupting events include at least one interrupting event selected from: a first category of interrupting events and a second category of interrupting events;
wherein the first category of interrupting events includes a degraded connectivity of a first multimedia conference device, and a degraded connectivity or performance of a conference bridge or the server; and
wherein the second category of interrupting events includes an unavailability of a first multimedia conference participant associated with the first multimedia conference device, and an action performed by the first multimedia conference participant associated with the first multimedia conference device.

15. The server of claim 11, wherein the processor is further configured to:
facilitate to provide one or more indications to one or more multimedia conference participants, wherein the one or more indications provide information of at least one of the substitute contents and the estimated duration.

16. The server of claim 11, wherein the processor is further configured to:
monitor the one or more interrupting events; and
determine whether the one or more interrupting events terminate.

17. The server of claim 16, wherein the processor is further configured to:
in response to determining the one or more interrupting events terminate, discontinue to provide the substitute contents; and
enable transmitting of multimedia conference contents provided by the first multimedia conference device.

18. A non-transitory computer-readable storage medium that comprises a set of instructions that are executable by at least one processor to cause one or more devices to perform a method for managing a multimedia conference call, the method comprising:
establishing a multimedia conference call between a plurality of multimedia conference devices, the multimedia conference call including communication of multimedia conference contents via one or more of the plurality of multimedia conference devices;
recording at least a portion of the multimedia conference contents;
detecting one or more interrupting events, wherein the one or more interrupting events occur during the multimedia conference call;
providing substitute contents to the other multimedia conference devices of the plurality of multimedia conference devices, wherein the substitute contents are generated based on a recorded portion of the multimedia conference contents associated with a time to the one or more interrupting events;

estimating a duration of the one or more interrupting events based on one or more types of the one or more interrupting events and historical data; and determining a length of the substitute contents based on the estimated duration.

* * * * *